UNITED STATES PATENT OFFICE.

ALFRED ADELBERT GLIDDEN, OF WATERTOWN, MASSACHUSETTS, ASSIGNOR TO HOOD RUBBER CO., A CORPORATION OF MASSACHUSETTS.

PROCESS FOR PREPARING A RUBBER SUBSTITUTE.

1,171,187.      Specification of Letters Patent.      Patented Feb. 8, 1916.

No Drawing.    Application filed October 11, 1913, Serial No. 794,663.   Renewed July 8, 1915.   Serial No. 38,780.

*To all whom it may concern:*

Be it known that I, ALFRED A. GLIDDEN, a citizen of the United States, residing at Watertown, Massachusetts, have invented certain new and useful Improvements in Processes for Preparing a Rubber Substitute, of which the following is a specification.

The object of the present invention is the production of elastic substances or rubber substitutes in a commercial way and the invention consists in the process hereinafter described and particularly set forth in the appended claims.

According to my present invention I prepare elastic substances or rubber substitutes by heating a mixture of finely divided vulcanized rubber wastes with a small percentage of a higher fatty acid such as stearic acid and any of the unsaturated hydrocarbons of the homologous series of which butadiene 1,3, $CH_2=CH-CH=CH_2$, is the lowest member. The action is as follows. The hydrocarbon devulcanizes or softens the vulcanized rubber waste and at the same time itself is polymerized to an elastic substance.

In order to illustrate the new process more fully the following example is given: 30 lbs. of ground inner tire tubes are mixed in an autoclave with 100 lbs. of β.γ.dimethylerythrene

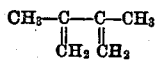

and one lb. of stearic acid and heated in the closed autoclave to 100° C. for a period of two to three weeks. At the end of this time the autoclave is opened, the solid elastic contents are washed on a washing mill, treated with superheated steam to remove dimeric hydrocarbons formed, and dried. On rolling the mass becomes perfectly homogeneous and transparent and is capable of vulcanization.

I claim:

1. The process of preparing elastic substances or rubber substitutes which consists in heating vulcanized rubber wastes with a small amount of a higher fatty acid and any of the unsaturated hydrocarbons of the homologous series of which butadiene 1,3 is the lowest member.

2. The process of preparing elastic substances or rubber substitutes which consists in heating vulcanized rubber wastes with any of the unsaturated hydrocarbons of the homologous series of which butadiene 1,3 is the lowest member, and stearic acid in proportion of one per cent. of the weight of hydrocarbon used, in sealed vessels to a temperature of 100° to 120° C. for periods from one to three weeks.

In testimony whereof, I affix my signature in presence of two witnesses.

ALFRED ADELBERT GLIDDEN.

Witnesses:
    LOTTA E. MARR,
    J. B. MOTT.